(No Model.)

T. RODES.
TIRE TIGHTENER.

No. 312,900. Patented Feb. 24, 1885.

WITNESSES:
Otto Berger
C. Sedgwick

INVENTOR:
T. Rodes
BY Munn & Co
ATTORNEYS.

UNITED STATES PATENT OFFICE.

TYREE RODES, OF WALES, TENNESSEE.

TIRE-TIGHTENER.

SPECIFICATION forming part of Letters Patent No. 312,900, dated February 24, 1885.

Application filed October 1, 1884. (No model.)

*To all whom it may concern:*

Be it known that I, TYREE RODES, of Wales, in the county of Giles and State of Tennessee, have invented a new and Improved Tire-Tightener, of which the following is a full, clear, and exact description.

The object of my invention is to facilitate the tightening of tires on wheels.

The invention consists in the combination, with the tire having bent ends, of a screw-bolt passed through the bent ends of the tire, two nuts on the bolt between one end of the tire and an adjacent end of a felly, and of a series of U-shaped washers on the bolt between the ends of the tire.

Figure 1:
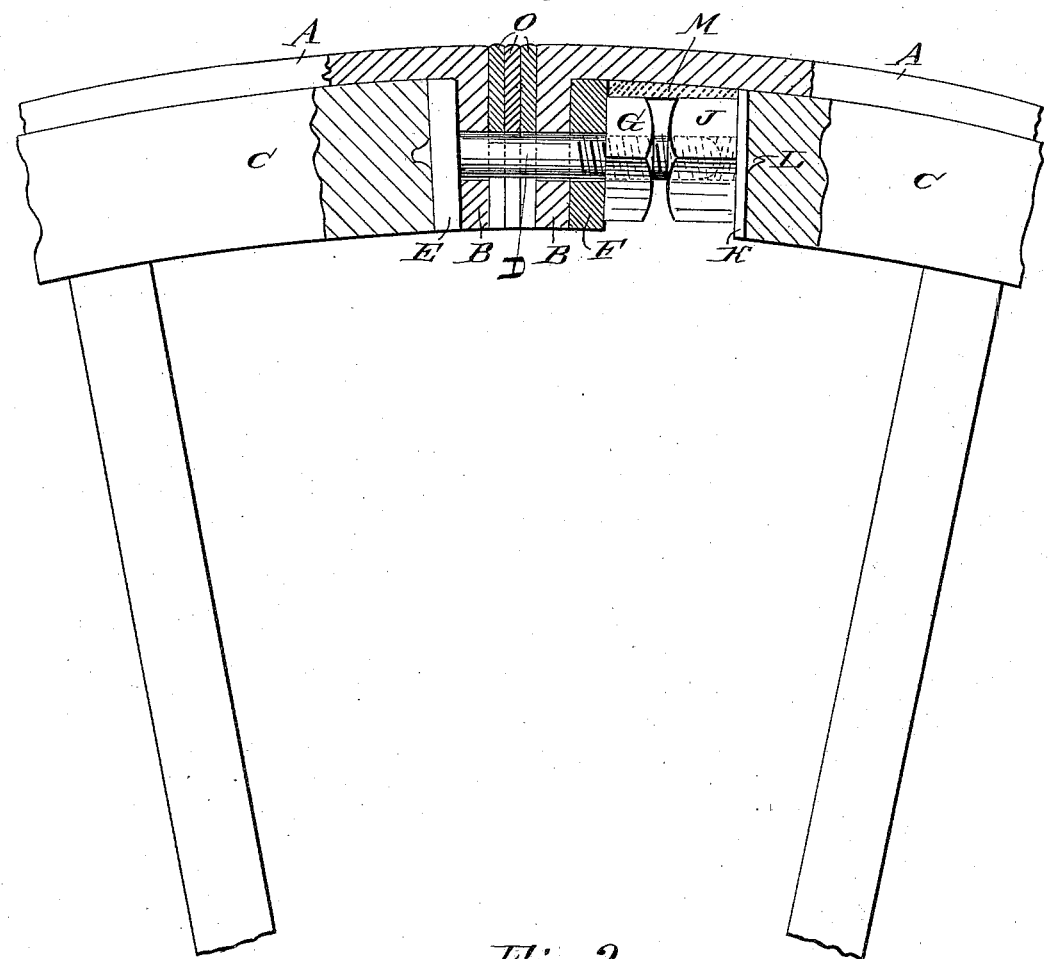
Figure 2:
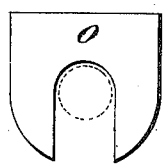

Reference is to be had to the accompanying drawings, forming part of this specification, in which similar letters of reference indicate corresponding parts in both the figures.
Figure 1 is a longitudinal sectional elevation of my improved tire-tightener, showing it applied. Fig. 2 is a face view of one of the washers.

The tire A has its ends B bent inward at right angles to fit against the ends of the fellies C, the ends B being provided with apertures through which a screw-bolt, D, passes, having a flat head, E, held between one end B of the tire and the corresponding end of the felly.

A washer, F, through which the bolt D passes, rests against the inner side of the other end B of the tire, and on the bolt a nut, G, is mounted, which rests against the washer F.

The free end of the bolt is screwed into a long nut, J, the opposite end of which rests against a plate, K, placed against the end of a felly, which plate is provided with a stud, L, passed into a notch in the end of the felly to hold the plate K in place. The plate K, the nuts J G, and the washer F are held between one end B of the tire and the corresponding end of a felly.
A series of U-shaped washers, O, are mounted on the bolt D, between the ends B of the tire, the outer edges of the washers being straight and flush with the outer surface of the tire.
A wedge-shaped piece, *m*, of leather is inserted between the under surface of the tire and nuts G J, to lock them in place and prevent them from turning.

The nut G is drawn up tight, whereby the ends B of the tire are pressed firmly against the washers O, which are thus held in place.

In case the tire is to be tightened, one or more washers O are removed and the nut G drawn up tight to bring the ends B of the tire toward each other and press them against the washers, and the washers together. Then the nut J is turned to press the ends of the fellies from each other, whereby the fellies are pressed firmly against the tire and the tire tightened, and at the same time the dish of the wheel can be adjusted.

Having thus described my invention, what I claim as new, and desire to secure by Letters Patent, is—

1. In a tire-tightener, the combination, with the bolt D, held in one end of the tire, and passed through the other end, of two nuts mounted on the bolt between the latter end of the tire and the adjacent end of the felly, substantially as herein shown and described.

2. In a tire-tightener, the combination, with the bolt D, held in one end of the tire, and passed through the other, of the nut G, through which the bolt D passes, and of the nut J, into which the end of the bolt is screwed, the free end of the nut J resting against one end of a felly, substantially as herein shown and described.

3. In a tire-tightener, the combination, with the tire A, having bent ends B, of the screw-bolt D, having a head, E, between one bent end B of the tire and the adjacent end of the felly, the U-shaped washers O, between the ends of the tire, and the nuts G J on the bolt between one end of the tire and the adjacent end of a felly, substantially as herein shown and described.

4. In a tire-tightener, the combination, with the tire A, having bent ends B, of the screw-bolt D, having a head, E, the U-shaped washers O, the washer F, the nuts G J, and the plate K, having a stud, L, substantially as herein shown and described.

TYREE RODES.

Witnesses:
J. H. RODES,
ROBT. RODES.